Oct. 26, 1948.  H. P. MURPHY  2,452,066

GAS DIFFUSION DEVICE FOR STORAGE BATTERIES

Filed March 24, 1945

INVENTOR
HAROLD P. MURPHY
BY
Augustus B. Stoughton
ATTORNEY

Patented Oct. 26, 1948

2,452,066

UNITED STATES PATENT OFFICE 2,452,066

GAS DIFFUSION DEVICE FOR STORAGE BATTERIES

Harold Purves Murphy, Ridley Park, Pa., assignor to The Electric Storage Battery Company, a corporation of New Jersey Application March 24, 1945, Serial No. 584,637

6 Claims. (Cl. 136—179)

This invention relates to explosion-proof casings or containers for storage batteries and has for its object the provision of a cover for such a casing designed to prevent the accumulation of an explosive mixture of gases under the cover.

It is recognized that a storage battery during the charging period and for some time after the charge is terminated gives off an explosion mixture of oxygen and hydrogen gases and while standing idle on open circuit may give off hydrogen which may form an explosive mixture with the air above the cells.

It is therefore an object of this invention to provide a cover which shall prevent the formation of an explosive mixture of gases thereunder over the battery cells.

A further object of this invention is to provide such a cover equipped with a diffusion member of porous inert material which will permit the rapid diffusion of hydrogen therethrough but will retard the diffusion of oxygen, thereby preventing the accumulation of a mixture of hydrogen and oxygen in explosive proportions.

Figure 1:
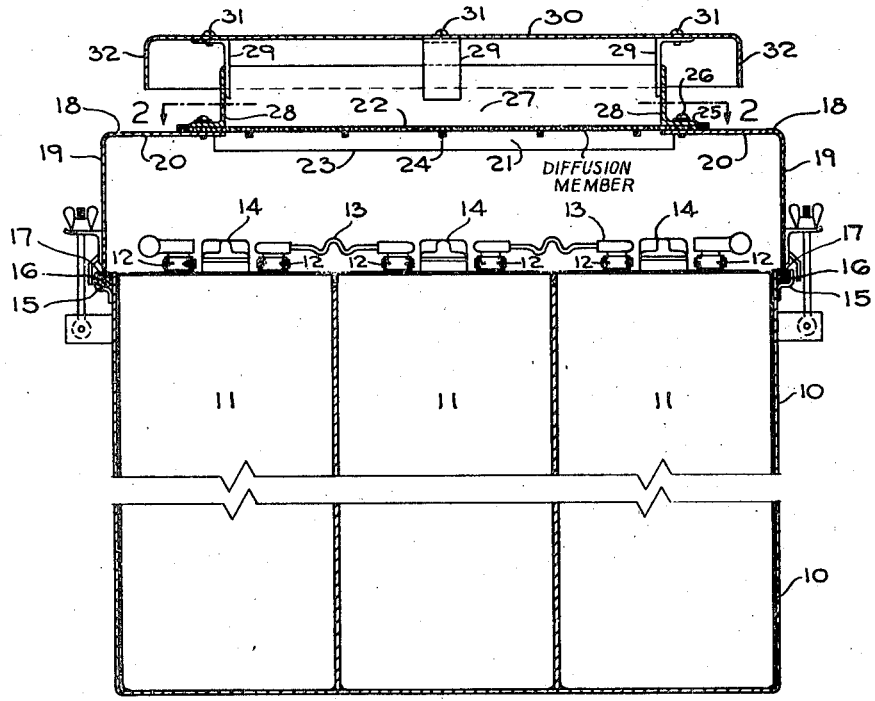
Figure 2:
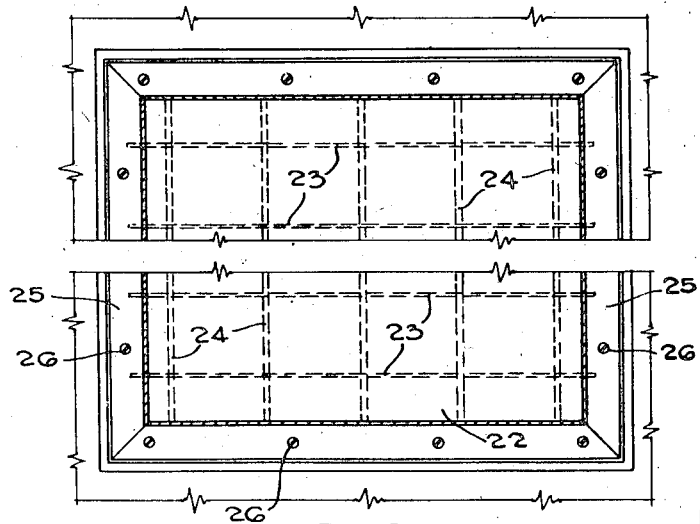

This invention will be more clearly understood by reference to the following description of one embodiment thereof in connection with the accompanying drawings in which:

Figure 1 is a sectional elevation of a storage battery assembled in a casing provided with a cover involving features of the invention; and Figure 2 is a sectional plan view taken on the line 2—2 of Figure 1.

In the drawings, 10 represents the casing of a multi-cell storage battery comprising individual cells 11 provided with the usual terminals 12, intercell connectors 13 and vents 14. The casing 10 may be of any suitable material such as steel.

The casing 10 is surrounded near its upper rim with a channel member 15, welded or otherwise fastened to the casing to provide a channel 16 in which is located a resilient sealing material 17 which may be soft rubber or the like.

Above the battery is shown a cover 18 of steel or similar material whose depending peripheral walls 19 rest upon and are partially embedded in the sealing material 17 to effect an air-tight seal at this point. In the roof 20 of the cover is a rectangular opening 21 which is completely covered by a diffusion member 22 comprising a sheet of porous material such as asbestos or glass wool. The sheet 22 is supported from below by a grille or grating comprising longitudinal bars 23 and cross bars 24, providing openings therethrough of suitable dimensions. The periphery of the sheet 22 which overlies the upper surface of the cover 18 around the rectangular opening is clamped to the cover by the clamping member 25 held in place by the screws 26. The clamping member 25 is provided with a rectangular opening 27 defined by the upstanding walls 28, said opening corresponding to and registering with the opening 21 in the cover. Fastened as by welding at spaced intervals to the inner surfaces of the walls 28 are shown angular members 29 supporting the rectangular supplementary cover 30 attached to the supports 29 by the screws 31. The supplementary cover 30 extends for some distance beyond the opening 27 on all sides and is provided with a peripheral depending skirt 32. The supplementary cover protects the diffusion member 22 from accidental mechanical injury or deposit of dirt or other foreign matter, but provides ample ventilation for the escape of gases evolved from the cells.

A number of different inert porous materials besides the sheet asbestos or glass wool mentioned, have been found satisfactory for the diffusion member, such as those known to the trade as "Masonite Presswood," "Celotex," sintered glass powder in sheet form or a thin soft rubber membrane suitably supported. The choice of such porous material as well as other details of design, such as the thickness and effective area of the diffusion member can readily be determined by one skilled in the art depending upon the expected volume of gases evolved from the cells.

From the foregoing it will be observed that there is provided in accordance with this invention a relatively simple and inexpensive construction for minimizing the possibility of the accumulation of an explosive mixture under the cover of a storage battery. While there is described a specific embodiment of this invention, modifications therein undoubtedly will occur to those skilled in the art and it is intended by the appended claims to cover all such modifications as come within the true spirit and scope of this invention.

I claim:

1. The combination, with a casing for a storage battery whose cells are provided with closures having vents from which gases including hydrogen may be evolved, of a cover for said casing spaced from said vents and adapted to collect evolved gases, said cover provided with a passage for the escape of gas, said passage closed by a perforated member supporting a mass of porous material of extended area and of such porosity as will permit the rapid diffusion of hydrogen therethrough but will retard the diffusion of other gases, said mass covering the perforations in said supporting member and said cover otherwise sealed to said casing against the free escape of the evolved gases.

2. In combination, a casing, a multicell storage battery housed in said casing, the cells being provided with suitable closures with suitable vents therethrough for the escape of evolved gases, a cover for said casing whose roof is spaced from said vents and comprises a supporting member having openings therethrough of large aggregate area compared to that of the vents, said openings closed by a mass of porous material of extended area and of such porosity as will permit the rapid diffusion of hydrogen therethrough but will retard the diffusion of other gases, said mass covering the perforations in said supporting member and said cover otherwise sealed to said casing against the free escape of the evolved gases.

3. The combination, with a casing for a storage battery whose cells are provided with closures having vents from which gases including hydrogen may be evolved, of a cover for said casing spaced from said vents and adapted to collect evolved gases, said cover provided with a passage for the escape of gas, said passage covered by a mass of porous material of extended area and of such porosity as will permit the rapid diffusion of hydrogen therethrough but will retard the diffusion of other gases, said cover otherwise sealed to said casing against the free escape of the evolved gases.

4. The combination with a storage battery whose cells are provided with closures having vents from which gases including hydrogen may be evolved, of a casing enclosing said battery provided with space above said vents for the collection of gases, said casing provided with a passage for the escape of gas, said passage covered by a mass of porous material of extended area and of such porosity as will permit the rapid diffusion of hydrogen but will retard the diffusion of other gases, said casing otherwise sealed against the free escape of the evolved gases.

5. A device for preventing the accumulation of explosive mixtures of hydrogen and oxygen over a storage battery having a plurality of cells comprising a porous diffusion member of extended area, said member offering appreciably less resistance to flow of hydrogen than to flow of oxygen, and means to support said member over the battery cells and to prevent the escape of gases from the cells into the surrounding atmosphere except through said member.

6. In a storage battery, a cell jar, means for venting the interior of said jar, and a porous diffusion member of extended area through which vented gases pass in escaping to the surrounding atmosphere, said diffusion member being sealed with respect to the cell venting means to prevent the free escape of the evolved gases from said venting means to the surrounding atmosphere except through said porous member and made of material that offers appreciably less resistance to flow of hydrogen than to flow of oxygen.

HAROLD PURVES MURPHY.

REFERENCES CITED

The following references are of record in the file of this patent:

UNITED STATES PATENTS

| Number | Name | Date |
|---|---|---|
| 441,843 | Hoy | Dec. 2, 1890 |
| 442,969 | Fitzgerald et al. | Dec. 16, 1890 |
| 1,496,757 | Lewis et al. | June 3, 1924 |
| 2,296,747 | Stover | Sept. 22, 1942 |

FOREIGN PATENTS

| Number | Country | Date |
|---|---|---|
| 611,798 | France | July 17, 1926 |
| 698,552 | Germany | Nov. 13, 1940 |